(12) United States Patent
Nozaki et al.

(10) Patent No.: US 12,229,923 B2
(45) Date of Patent: Feb. 18, 2025

(54) MONITORING CAMERA AND IMAGE QUALITY IMPROVING METHOD

(71) Applicant: PANASONIC I-PRO SENSING SOLUTIONS CO., LTD., Fukuoka (JP)

(72) Inventors: Hirotaka Nozaki, Fukuoka (JP); Jun Ikeda, Fukuoka (JP); Yohei Aoki, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 386 days.

(21) Appl. No.: 17/580,089

(22) Filed: Jan. 20, 2022

(65) Prior Publication Data

US 2022/0237747 A1 Jul. 28, 2022

(30) Foreign Application Priority Data

Jan. 22, 2021 (JP) .................................. 2021-008987

(51) Int. Cl.
*G06T 5/70* (2024.01)
*G06N 20/00* (2019.01)
(Continued)

(52) U.S. Cl.
CPC ............... *G06T 5/70* (2024.01); *G06N 20/00* (2019.01); *G06T 5/20* (2013.01); *G06T 7/215* (2017.01); *H04N 23/81* (2023.01)

(58) Field of Classification Search
CPC .. G06T 5/70; G06T 5/20; G06T 7/215; G06T 5/60; G06T 2207/20012;
(Continued)

(56) References Cited

U.S. PATENT DOCUMENTS 9,367,902 B2 * 6/2016 Sasaki .................. H04N 25/683
9,734,612 B2 * 8/2017 Yamaji .................... G06T 7/246
(Continued)

FOREIGN PATENT DOCUMENTS

JP 2001-223941 8/2001
JP 2011-166535 8/2011
(Continued)

OTHER PUBLICATIONS

Office Action from Japan Patent Office (JPO) in Japanese Patent Appl. No. 2021-008987, dated Oct. 29, 2024, together with an English language translation.

*Primary Examiner* — Tom Y Lu
*Assistant Examiner* — Pardis Sohraby
(74) *Attorney, Agent, or Firm* — Greenblum & Bernstein, P.L.C.

(57) ABSTRACT

A monitoring camera includes an imaging unit configured to capture an image of an imaging area, and a processor configured to determine a first intensity and a second intensity to be different from each other. The first intensity indicates an intensity of a noise reduction processing executed on an attention portion in the captured image of the imaging area, and the second intensity indicates an intensity of a noise reduction processing executed on a non-attention portion in the captured image. The first intensity is lower than the second intensity. The processor is configured to execute the noise reduction processing on the attention portion based on the determined first intensity, to execute the noise reduction processing on the non-attention portion based on the determined second intensity, and to output an image after the noise reduction processing.

15 Claims, 11 Drawing Sheets

(51) Int. Cl.
*G06T 5/20* (2006.01)
*G06T 7/215* (2017.01)
*H04N 23/81* (2023.01)

(58) Field of Classification Search
CPC . G06T 2207/20081; G06T 7/20; G06N 20/00;
G06N 3/08; H04N 23/81; H04N 23/683;
H04N 5/144
USPC .......................................................... 382/275
See application file for complete search history.

(56) References Cited

U.S. PATENT DOCUMENTS

| | | | |
|---|---|---|---|
| 2004/0201717 A1 | 10/2004 | Matsushima | |
| 2005/0157188 A1* | 7/2005 | Kubo | H04N 23/6812 |
| | | | 348/241 |
| 2008/0111901 A1* | 5/2008 | Kawashima | H04N 19/137 |
| | | | 348/241 |
| 2011/0292210 A1* | 12/2011 | Mizutani | H04N 25/60 |
| | | | 348/148 |
| 2017/0352162 A1 | 12/2017 | Ruan et al. | |
| 2018/0033120 A1* | 2/2018 | Wang | H04N 23/81 |
| 2018/0330476 A1 | 11/2018 | Omori | |
| 2019/0325565 A1 | 10/2019 | Omori | |
| 2022/0292707 A1* | 9/2022 | Babazaki | G06V 10/44 |

FOREIGN PATENT DOCUMENTS

| | | |
|---|---|---|
| JP | 2014-068253 | 4/2014 |
| JP | 2015-132949 | 7/2015 |
| JP | 2018-191178 | 11/2018 |
| WO | 2016/139964 | 9/2016 |

* cited by examiner

FIG. 4

| TYPE | ATTENTION LEVEL (j) FOR EACH TYPE |
|---|---|
| NON-DETECTION AREA | 0 |
| VEHICLE (LICENSE PLATE ABSENT) | 0 |
| ANIMAL | 0.4 |
| PERSON (WHOLE BODY) | 0.6 |
| PERSON (HEAD PORTION) | 0.6 |
| TWO-WHEEL VEHICLE | 0.8 |
| VEHICLE (LICENSE PLATE PRESENT) | 1 |
| FACE | 1 |

FIG. 9

| | ATTENTION LEVEL (j) |
|---|---|
| OTHER THAN ROAD | 0.1 |
| ROAD (FAR) | 0.5 |
| ROAD (NEAR) | 1 |

FIG. 10

| NR INTENSITY | SNR | AFTERIMAGE PREVENTION |
|---|---|---|
| HIGH | GOOD | LOW |
| LOW | POOR | HIGH |

MONITORING CAMERA AND IMAGE QUALITY IMPROVING METHOD

CROSS-REFERENCE TO RELATED APPLICATIONS

This application is based on and claims priority under 35 USC 119 from Japanese Patent Application No. 2021-008987 filed on Jan. 22, 2021, the contents of which are incorporated herein by reference.

TECHNICAL FIELD

The present disclosure relates to a monitoring camera and an image quality improving method.

BACKGROUND ART

Patent Literature 1 discloses an imaging device that appropriately controls a processing of reducing a noise component on image data in consideration of an intensity of subject light. The imaging device includes a photometric unit that measures subject light, a noise reduction processing unit that executes a noise reduction processing on image data obtained by exposure in an imaging element to reduce a noise component caused by noises generated in the imaging element, and a control unit that controls an intensity of the noise reduction processing based on an exposure time of the exposure in the imaging element and an intensity of the subject light measured by the photometric unit.

CITATION LIST

Patent Literature

Patent Literature 1: JP-2014-68253-A

In the configuration disclosed in Patent Literature 1, the intensity of the noise reduction processing is determined in accordance with a temporal change amount of a luminance value of a captured image, and the noise reduction processing with the determined intensity is uniformly executed on the entire captured image data. Therefore, the same signal noise ratio (SNR) may be obtained or an afterimage may be generated for both an attention subject and a non-attention subject in the image data.

For example, in a case where the surroundings are bright, when image data is captured in which a moving body portion (an example of an attention target) such as a person or a vehicle and a still portion (an example of a non-attention target) are mixed, since the gain of an image sensor is low and the amplification of a noise level is small, it is possible to distinguish a temporal change of luminance due to an actual movement from a temporal change due to noises. Even when a noise reduction processing is uniformly executed on the entire image data, an afterimage of the moving body portion is not noticeable. However, in a case where image data (see the above description) in which a moving body portion and a still portion are mixed is captured in a low-illuminate environment (for example, at night or in a dark room), the gain of the image sensor increases. As a result, when the noise reduction processing is executed at a high intensity so as to improve the SNR, an afterimage of the moving body component is increased. On the contrary, when the noise reduction processing is executed at a low intensity so as to prevent an afterimage, the SNR deteriorates. This is because it is difficult to distinguish between a motion and a noise in the image data, and it is difficult to execute an appropriate noise reduction processing.

SUMMARY OF INVENTION

The present disclosure has been made in view of the circumstances described above in the related art, and an object of the present disclosure is to provide a monitoring camera, an image quality improving method, and a program for preventing an afterimage of a subject to be focused in a captured image, reducing noises, and improving recognition accuracy of the subject, regardless of a surrounding environment.

The present disclosure provides a monitoring camera including an imaging unit configured to capture an image of an imaging area, and a processor configured to determine a first intensity and a second intensity to be different from each other. The first intensity indicates an intensity of a noise reduction processing executed on an attention portion in the captured image of the imaging area, and the second intensity indicates an intensity of a noise reduction processing executed on a non-attention portion in the captured image. The first intensity is lower than the second intensity. The processor is configured to execute the noise reduction processing on the attention portion based on the determined first intensity, to execute the noise reduction processing on the non-attention portion based on the determined second intensity, and to output an image after the noise reduction processing.

The present disclosure provides an image quality improving method to be executed by a monitoring camera. The image quality improving method includes capturing an image of an imaging area; determining a first intensity and a second intensity to be different from each other, the first intensity indicating an intensity of a noise reduction processing executed on an attention portion in the captured image of the imaging area, and the second intensity indicating an intensity of a noise reduction processing executed on a non-attention portion in the captured image; executing the noise reduction processing on the attention portion based on the determined first intensity, and executing the noise reduction processing on the non-attention portion based on the determined second intensity; and outputting an image after the noise reduction processing. The first intensity is lower than the second intensity.

Also, it should be noted that these comprehensive or specific aspects may be achieved by a system, a device, a method, an integrated circuit, a computer program, or a recording medium, or may be achieved by any combination of a system, a device, a method, an integrated circuit, a computer program, and a recording medium.

Further advantages and effects of an aspect of the present invention will become apparent from the specification and the drawings. These advantages and/or effects are respectively provided by features described in several embodiments, the specification, and the drawings, and it is not necessary to provide all of the advantages and/or effects in order to obtain one or more identical features.

According to the present disclosure, it is possible to prevent an afterimage of a subject to be focused in a captured image, reduce noises, and improve recognition accuracy of the subject, regardless of a surrounding environment.

BRIEF DESCRIPTION OF DRAWINGS

FIG. 4 is a diagram showing an example of an attention level table indicating a type of a detected object and an attention level (j) for each type.

FIG. 9 is a diagram showing an example of an attention level table indicating an attention level (j) of each detection assumption area of the captured image data in FIG. 8.

FIG. 10 is a diagram showing an example of a correspondence relationship among a noise reduction intensity, an SNR, and an afterimage prevention effect.

DESCRIPTION OF EMBODIMENTS

Hereinafter, embodiments specifically disclosing a monitoring camera, an image quality improving method, and a program according to the present disclosure will be described in detail with reference to the drawings as appropriate. Unnecessarily detailed description may be omitted. For example, detailed description of a well-known matter or repeated description of substantially the same configuration may be omitted. This is to avoid unnecessary redundancy in the following description and to facilitate understanding for those skilled in the art. It is to be understood that the accompanying drawings and the following description are provided to enable those skilled in the art to fully understand the present disclosure, and are not intended to limit the range of the claims.

Figure 1:
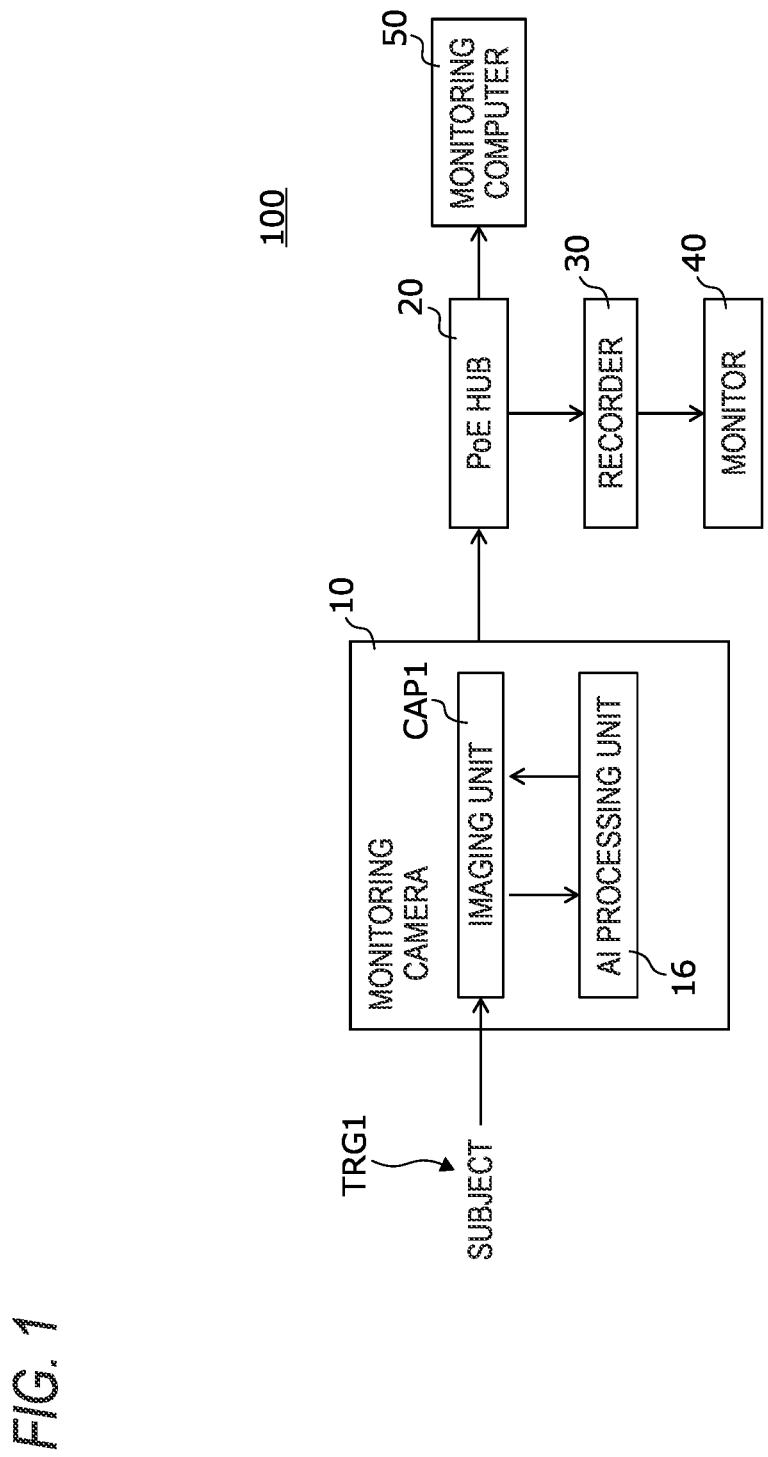
FIG. 1 is a diagram showing a system configuration example of a monitoring camera system according to a first embodiment.

FIG. 1 is a diagram showing a system configuration example of a monitoring camera system 100 according to a first embodiment. The monitoring camera system 100 includes a monitoring camera 1, a power on Ethernet (PoE (registered trademark)) hub 20, a recorder 30, a monitor 40, and a monitoring computer 50. The monitoring camera 10, the recorder 30, and the monitoring computer 50 constitute a network in which the monitoring camera 10, the recorder 30, and the monitoring computer 50 can communicate with one another via the PoE hub 20.

The network is a wired or wireless network. The wired network is, for example, a universal serial bus (USB) cable, a wired local area network (LAN), and the like, and is not limited thereto. On the other hand, the wireless network is, for example, any one of a wireless LAN such as Wi-Fi (registered trademark), Bluetooth (registered trademark), and Wireless Gigabit (WiGig), and is not limited thereto. In the following description, an image captured by the monitoring camera 10 (hereinafter referred to as a "captured image") includes not only data of the captured image but also camera identification information and imaging date and time information of the monitoring camera 10 that captured the image.

The monitoring camera 10 may be installed outdoors or indoors. When the monitoring camera 10 is installed outdoors, the monitoring camera 10 is fixedly installed by being mounted to, for example, a pole installed on a road side or a parking lot. On the other hand, when the monitoring camera 10 is installed indoors, the monitoring camera 10 is fixedly installed on a ceiling surface in the vicinity of an automatic door in a building such as a store, a museum, and an art museum. It is needless to say that an installation location of the monitoring camera 10 is not limited to those described above.

The monitoring camera 10 includes at least an imaging unit CAP1 and an artificial intelligence (AI) processing unit 16. The imaging unit CAP1 of the monitoring camera 10 captures an image (that is, a captured image) of a subject TRG1 including an object (that is, a moving body) present in an imaging area (that is, a monitoring area) within a predetermined angle of view. The AI processing unit 16 of the monitoring camera 1 can execute a processing by artificial intelligence (AI) and detects a moving body (an example of an attention portion) from a captured image obtained from the imaging unit CAP1 by using the artificial intelligence. A detailed configuration example of the imaging unit CAP1 and the AI processing unit 16 will be described later with reference to FIG. 2. The moving body is an object to be monitored by the monitoring camera 10, and is, for example, a person, a face of a person, a vehicle, a two-wheel vehicle such as a motorcycle, a bicycle, a three-wheel vehicle, or a kick scooter. The moving body is not limited to these examples, and the object may not be limited to a moving body.

Figure 2:
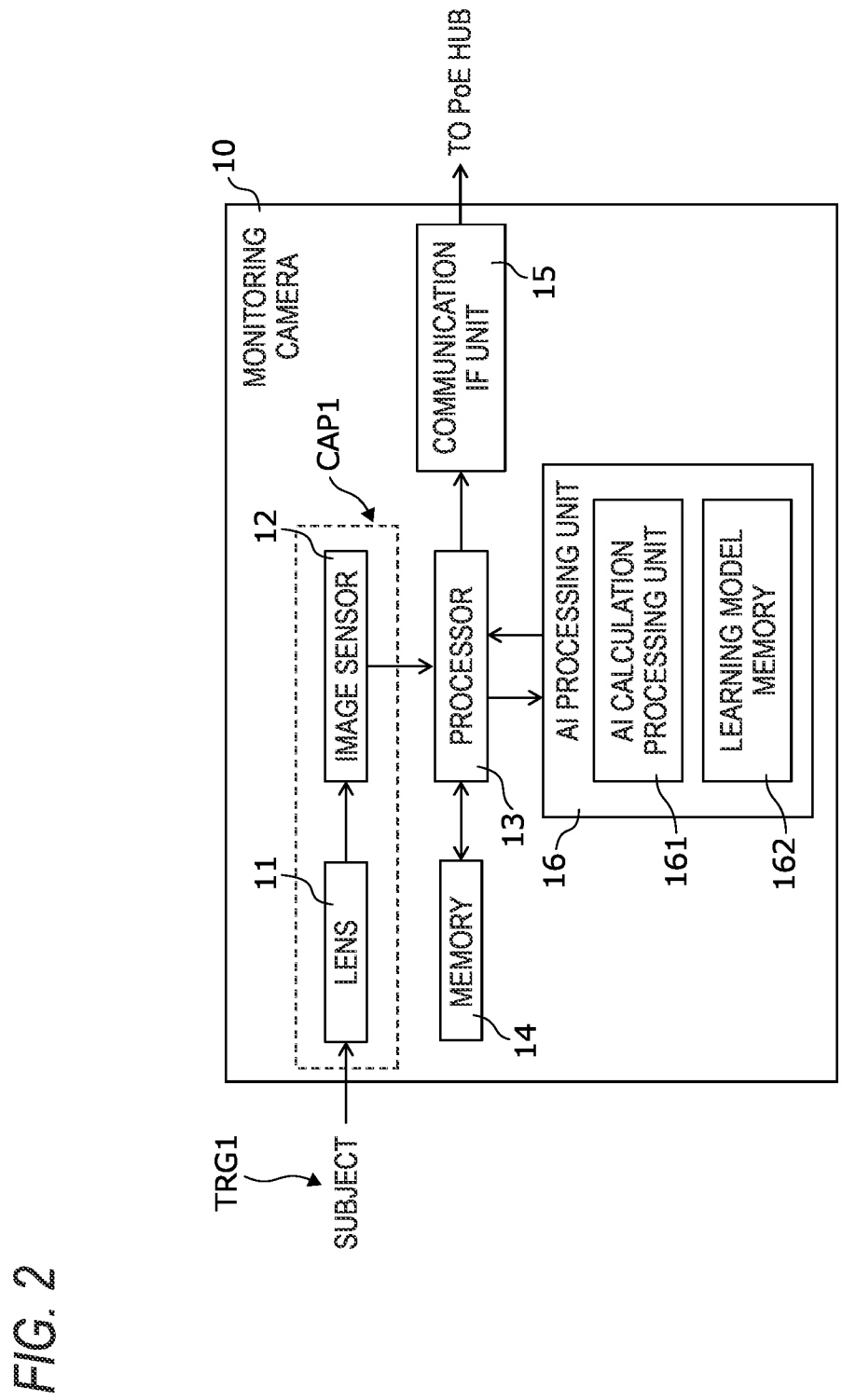
FIG. 2 is a block diagram showing a hardware configuration example of a monitoring camera according to the first embodiment.

In the monitoring camera 10, a learning model for enabling AI to detect an object is stored in a learning model memory 162 (see FIG. 2). The learning model is a parameter group having a characteristic of an AI processing function that can be executed by the AI processing unit 16. That is, the learning model is a parameter group for detecting a portion of a moving body to be detected from the entire captured image (hereinafter, also referred to as a "frame"). The learning model may be, for example, a parameter group for determining an AI constituent element (for example, a neural network) constructed in the monitoring camera 10. The parameter group for determining a constituent element of the neural network includes, for example, information indicating a connection relationship between units of the neural network, a weight coefficient, and the like. The learning model is, for example, transmitted from the monitoring computer 50 to the monitoring camera 10 via the PoE hub 20, and is stored before the monitoring camera 10 starts to operate.

That is, the monitoring camera 10 constructs a corresponding neural network for each moving body (object) to be detected, and can detect the object by using the corresponding neural network. For example, the monitoring camera 10 constructs a neural network for detecting a person (specifically, the whole body of the person), a neural network for detecting the face of a person, and a neural network for detecting a vehicle, and can detect a corresponding moving body (object).

The PoE hub 20 transmits captured image data from the monitoring camera 10 to the recorder 30 and the monitoring computer 50. For example, when the PoE hub 20 is connected to the monitoring camera 10 via a wired network (not shown, see the above description), the PoE hub 20 supplies driving power to the monitoring camera 10.

When the recorder 30 receives, from the PoE hub 20, the captured image data transmitted from the monitoring camera 10, the recorder 30 stores the captured image data in association with storing date and time and camera identification information of the monitoring camera 10. As described above, the captured image data includes the camera identification information of the monitoring camera 10 that is a generation source of the captured image data and imaging date and time information, in addition to the captured image data. Although not shown in FIG. 1, a plurality of recorders 30 may be connected to the PoE hub 20.

The monitor 40 is a display device configured with, for example, a liquid crystal display (LCD) or an organic electroluminescence (EL). The monitor 40 displays the captured image data transmitted from recorder 30, for example, when the captured image stored in recorder 30 is instructed to be displayed by an operation of a user (for example, an operator of the monitoring camera system 100).

The monitoring computer 50 is, for example, not only a desktop or notebook personal computer, but also an information processing device such as a smartphone, a tablet terminal, or a server computer machine having high-performance specifications. The monitoring computer 50 receives, for example, an operation of a user (see the above description), and receives captured image data of an imaging area (in other words, a monitoring area) captured by the monitoring camera 10 from the PoE hub 20 and displays the captured image data in accordance with the operation of the user.

FIG. 2 is a block diagram showing a hardware configuration example of the monitoring camera 10 according to the first embodiment. The monitoring camera 10 includes at least the imaging unit CAP1, a processor 13, a memory 14, a communication interface (IF) unit 15, and the AI processing unit 16. The imaging unit CAP1 includes a lens 11 and an image sensor 12. The AI processing unit 16 includes an AI calculation processing unit 161 and the learning model memory 162.

The lens 11 as an example of the imaging unit CAP1 includes, for example, a focus lens and a zoom lens. When incident light that is light reflected by a subject TRG1 present in an imaging area is incident onto the lens 11, the lens 11 forms an optical image of the subject TRG1 on a light receiving surface (in other words, an imaging surface) of the image sensor 12. The lens 11 includes lenses having various focal lengths or imaging ranges in accordance with an installation location, the imaging use, or the like of the monitoring camera 10.

The image sensor 12 as an example of the imaging unit executes a photoelectric conversion for converting light received on a light receiving surface (in other words, an imaging surface) into an electric signal. The image sensor 12 is configured with, for example, a charge coupled device (CCD) or a complementary metal oxide semiconductor (CMOS). The image sensor 12 transmits an electric signal (analog signal) corresponding to the light received on the light receiving surface (in other words, the imaging surface) to the processor 13 at predetermined time intervals (for example, $\frac{1}{60}$ (seconds)). That is, a frame rate of monitoring camera 10 is, for example, 60 frames per second (fps). This value is an example, and the frame rate is not limited to 60 fps. The analog signal is converted into captured image data in a digital format by the processor 13. As a result, the captured image data is generated by the processor 13. The conversion from the analog signal to the digital format may be executed by the image sensor 12. In this manner, the monitoring camera 10 can acquire captured image data in a digital format at predetermined time intervals (for example, $\frac{1}{60}$ (seconds)).

The processor 13 includes, for example, a central processing unit (CPU), a digital signal processor (DSP), a graphical processing unit (GPU), or a field programmable gate array (FPGA). The processor 13 functions as a controller that governs the overall operation of the monitoring camera 10, and executes a control processing for governing the operation of each unit of the monitoring camera 10, a data input and output processing among units of the monitoring camera 10, a data calculation processing, and a data storing processing. The processor 13 operates in accordance with a program and data stored in the memory 14. The processor 13 uses the memory 14 at the time of operation, and temporarily stores data or information generated or acquired by the processor 13 in the memory 14.

For example, the processor 13 generates captured image data in a digital format by executing a predetermined signal processing on the electric signal output from the image sensor 12, and transmits the captured image data to the AI processing unit 16. As described above, the processor 13 can acquire captured image data in a digital format at predetermined time intervals (for example, $\frac{1}{60}$ (seconds)), and transmits the acquired captured image data to the AI processing unit 16.

The processor 13 executes a noise reduction processing on current captured image data (frame) generated by the image sensor 12 or the processor 13 by using a processing result (see the following description) of the AI processing unit 16. Accordingly, in the current captured image data, the monitoring camera 10 can execute a noise reduction processing at a low intensity on an attention portion (for example, a portion of a moving body such as a face of a person detected by the AI processing unit 16) appearing in the captured image data to reduce an influence of an afterimage due to a movement, and can execute a noise reduction processing at a high intensity on a non-attention portion (for example, a portion where no movement occurs) present on the same captured image data to generate image data having a high signal noise ratio (SNR). Details of the noise reduction processing executed by the processor 13 will be described later with reference to FIG. 3.

The memory 14 is configured with, for example, a random access memory (RAM) and a read only memory (ROM), and temporarily stores a program necessary for executing an operation of the monitoring camera 10 and data or information generated during the operation. The RAM is, for example, a work memory used when monitoring camera 10 operates. The ROM pre-stores, for example, a program according to the present disclosure for controlling the monitoring camera 10. In other words, the processor 13 can execute various processings related to the image quality improving method according to the present disclosure in the monitoring camera 10 that is a computer by executing the program stored in the ROM.

For example, the memory 14 stores a detection result (see the following description) of a moving body (object) such as a face of a person detected by the AI processing unit 16 based on captured image data generated by the image sensor 12 or the processor 13 in the past.

The communication IF unit 15 as an example of a communication unit executes data communication (transmission and reception) with the PoE hub 20 connected via a network (see the above description). For example, the communication IF unit 15 transmits the captured image data subjected to a noise reduction processing (see the following description) by the processor 13 to the PoE hub 20 via the network (see the above description). The communication IF unit 15 receives data or information transmitted from the monitoring computer 50 via the network (see the above description).

The AI processing unit 16 detects an object (for example, a moving body such as a face of a person) that is an attention portion from the captured image data transmitted from the processor 13 by using artificial intelligence (AI). The AI processing unit 16 is configured with, for example, a processor such as a CPU, a DSP, a GPU, and an FPGA, and a memory such as a flash memory.

The AI calculation processing unit 161 forms artificial intelligence (AI) based on a learning model stored in the learning model memory 162. For example, the AI calculation processing unit 161 forms a neural network (see the above description) based on the learning model. The AI calculation processing unit 161 inputs the captured image data generated by the processor 13, and detects an object (for example, a moving body such as a face of a person) that is an attention portion from the input captured image data by the neural network based on the learning model. A detailed configuration example of the AI calculation processing unit 161 will be described later with reference to FIG. 3.

The learning model memory 162 is configured with, for example, a memory such as a RAM, a ROM, and a flash memory. The learning model memory 162 stores a learning model that is used for a detection processing for each object (moving body) and is generated in advance by a learning processing. The AI calculation processing unit 161 executes a learning model for each object (moving body) from the learning model memory 162 to form a corresponding neural network (see the above description), thereby detecting an object (moving body) reflected in the captured image data.

Figure 3:
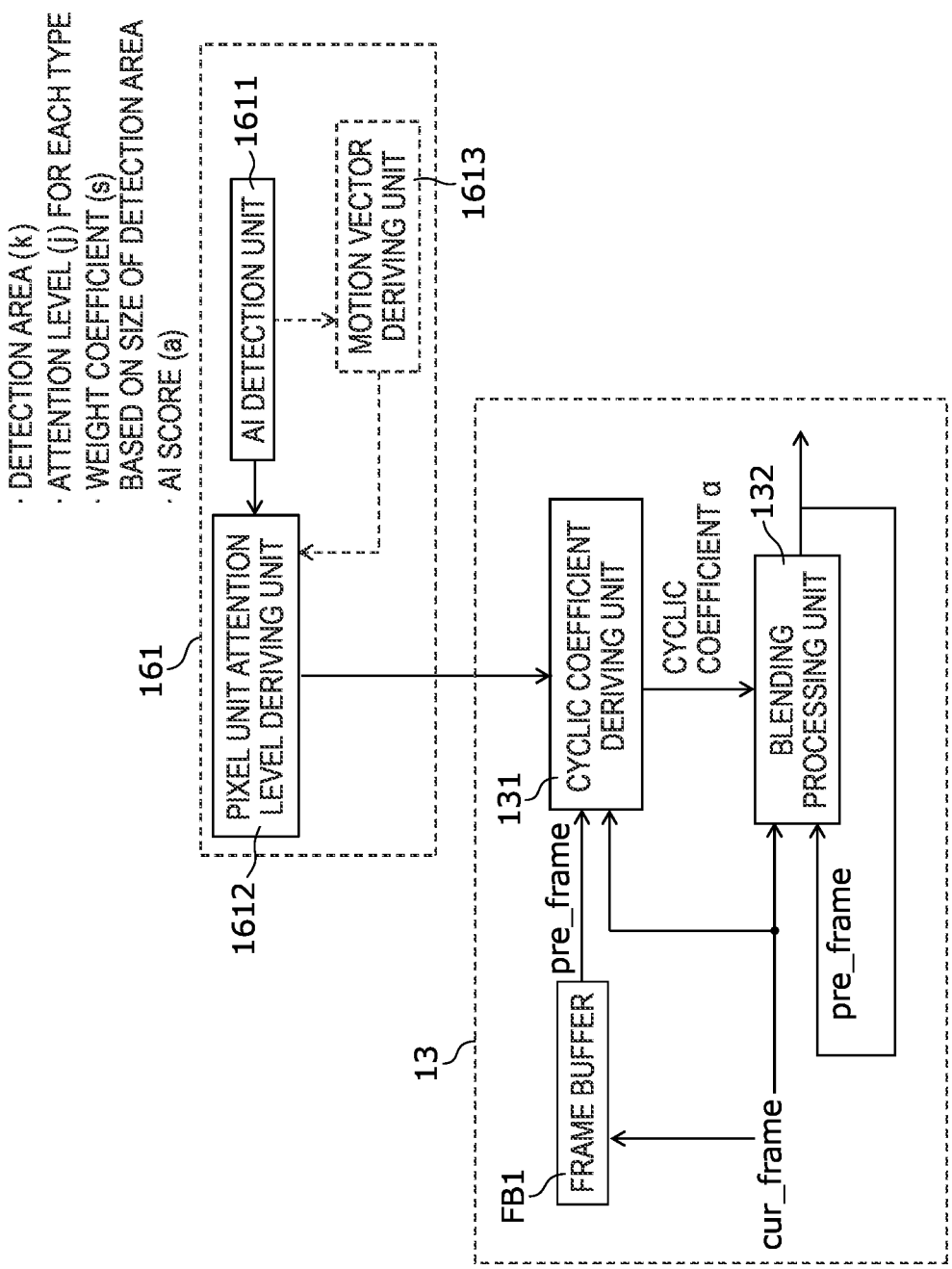
FIG. 3 is a block diagram showing an example of a functional configuration of a processor and an AI processing unit.

FIG. 3 is a block diagram showing an example of a functional configuration of the processor 13 and the AI processing unit 16. The processor 13 includes a frame buffer FB1, a cyclic coefficient deriving unit 131, and a blending processing unit 132. The AI calculation processing unit 161 of the AI processing unit 16 includes at least an AI detection unit 1611 and a pixel unit attention level deriving unit 1612. The AI calculation processing unit 161 may further include a motion vector deriving unit 1613. Although the learning model memory 162 is not shown in FIG. 3, at least the AI detection unit 1611 is functionally configured based on a learning model read from the learning model memory 162.

The AI detection unit 1611 detects an object of an attention portion (for example, a moving body such as a face of a person) from the captured image data generated by the image sensor 12 or the processor 13 based on an AI learning model read from the learning model memory 162. The AI detection unit 1611 derives, as a detection result, a detection area (k) of an object, an attention level (j) for each type of a detected object, a weight coefficient (s) based on a size of a detection area among a predetermined size of the captured image data, and an AI score (a) that indicates accuracy (certainty) of a detected object.

The detection area (k) has a value of "0" or "1" for each pixel among the number of pixels of the captured image data (for example, 1920×1080 pixels in the case of full high definition). The detection area (k) is "1" in the case of a pixel in which an object is detected, and the detection area (k) is "0" in the case of a pixel in which no object is detected.

The attention level (j) for each type of a detected object is a value indicating an attention level (j) predetermined for each type of an object (a moving body) to be focused in the captured image data. Here, the attention level (j) for each type of a detected object will be described with reference to FIG. 4. FIG. 4 is a diagram showing an example of an attention level table indicating a type of a detected object and an attention level (j) for each type.

In the attention level table, a type of an object detected by the AI detection unit 1611 and a value of an attention level (j) predetermined for each type are associated with each other. An attention level (j) of a non-detection area in which no object is detected is "0", that is a minimum value. Similarly, an attention level (j) of a vehicle of which a license plate is not detected (for example, a vehicle traveling in a lateral direction when viewed from the monitoring camera 10) is also "0" that is a minimum value. An attention level (j) of an animal is "0.4". An attention level (j) of a person whose whole body is reflected is "0.6". An attention level (j) of a person for whom only head portion is reflected is "0.6". An attention level (j) of a two-wheel vehicle is "0.8". An attention level (j) of a vehicle of which a license plate is detected (for example, a vehicle traveling in a direction of the monitoring camera 10) is "1" that is a maximum value. An attention level (j) of a face of a person is "1" that is a maximum value.

The weight coefficient (s) is a value derived by the AI detection unit 1611 according to a ratio of a detected object to a size of the captured image data, and specifically, has a value from "0" to "1". For example, when the ratio of an object to the size of the captured image data is less than a lower limit value of a predetermined range, the weight coefficient (s) is "0", and when the ratio of an object to the size of the captured image data is larger than an upper limit value of the predetermined range (see the above description), the weight coefficient (s) is "1".

The AI score (a) is a value indicating the accuracy (that is, certainty) of a detected object, and specifically has a value from "0" to "1". For example, when the accuracy of the object is larger than an upper limit value (that is, 80%) of a predetermined ratio range (for example, 30% to 80%), the AI score (a) is "1", and when the certainty of the object is less than a lower limit value (that is, 30%) of the predetermined ratio range (for example, 30% to 80%), the AI score (a) is "0".

The pixel unit attention level deriving unit 1612 derives an attention level for each pixel (that is, a pixel unit attention level) of the captured image data (hereinafter, also referred to as a "current frame") that is a target of a detection processing by the AI detecting unit 1611, by using a detection result from the AI detecting unit 1611, and transmits a derivation result for each pixel to the cyclic coefficient deriving unit 131. When the pixel unit attention level is high, the pixel unit is an attention portion in the captured image data. For example, the pixel unit attention level deriving unit 1612 derives (calculates) an attention level for each pixel (that is, a pixel unit attention level) in the current frame as F(k, s, a, j)=k×s×a×j. Therefore, the pixel unit attention level deriving unit 1612 derives, for example, an attention level of a non-detection area of an object or a vehicle (a license plate is not detected) as "0". This is because the attention level (j) of the non-detection area and the attention level (j) of the vehicle (a license plate is not detected) are both "0".

The pixel unit attention level deriving unit 1612 may derive an attention level for each pixel (that is, a pixel unit attention level) in the current frame by using not only the detection result from the AI detection unit 1611 but also a derivation result of a motion vector from the motion vector deriving unit 1613.

The motion vector deriving unit 1613 calculates (an example of deriving) a motion vector indicating a moving direction and a moving amount of a moving body (for example, a person) in the captured image data based on a processing result of the AI detection unit 1611 (for example, a detection position in a current frame and a detection position in a previous frame of a moving body in the captured image data within the same angle of view). The motion vector deriving unit 1613 transmits the calculation (derivation) result to the pixel unit attention level deriving unit 1612.

When the pixel unit attention level deriving unit 1612 acquires the derivation result of the motion vector from the motion vector deriving unit 1613, the pixel unit attention level deriving unit 1612 derives (calculates) an attention level for each pixel (that is, a pixel unit attention level) in the current frame as F(k, s, a, j, v)=k×s×a×j×v. The pixel unit attention level deriving unit 1612 transmits the derivation result of F(k, s, a, j, v)=k×s×a×j×v (that is, the pixel unit attention level) to the cyclic coefficient deriving unit 131.

The frame buffer FB1 is configured with a semiconductor memory such as a RAM, and temporarily stores the captured image data (that is, a current frame (=cur_frame)) generated by the image sensor 12 or the processor 13 at predetermined time intervals (for example, ¹⁄₆₀ seconds).

The cyclic coefficient deriving unit 131 uses the derivation result of the pixel unit attention level from the pixel unit attention level deriving unit 1612 and a previous frame and a current frame read from the frame buffer FB1 to execute a spatial filter processing on the derivation result of the pixel unit attention level in the current frame, and further executes a time filter processing using the pixel unit attention level in the current frame and a pixel unit attention level in the previous frame. Accordingly, the cyclic coefficient deriving unit 131 can derive a cyclic coefficient α using an NR (noise reduction) processing executed by the blending processing unit 132 (see FIGS. 5 and 6). Specifically, the cyclic coefficient deriving unit 131 derives (calculates) the cyclic coefficient α=G(t, x)={γF(t)+(1−γ)G(t−1, x)}×{(m−x)/m}, and transmits the derivation result to the blending processing unit 132. γ is a cyclic coefficient of a time filter, has a fixed value, and has a value of 0 to 1.

Figure 5:
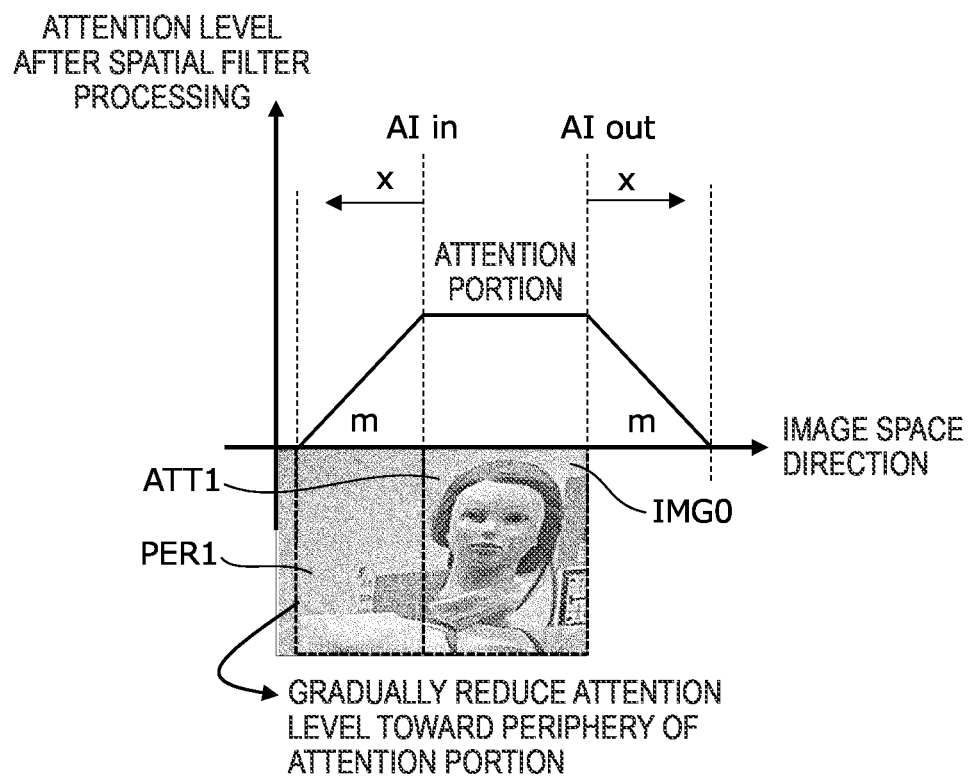
FIG. 5 is a graph showing an example of a relationship between an image space direction and an attention level after a spatial filter processing.
Figure 6:
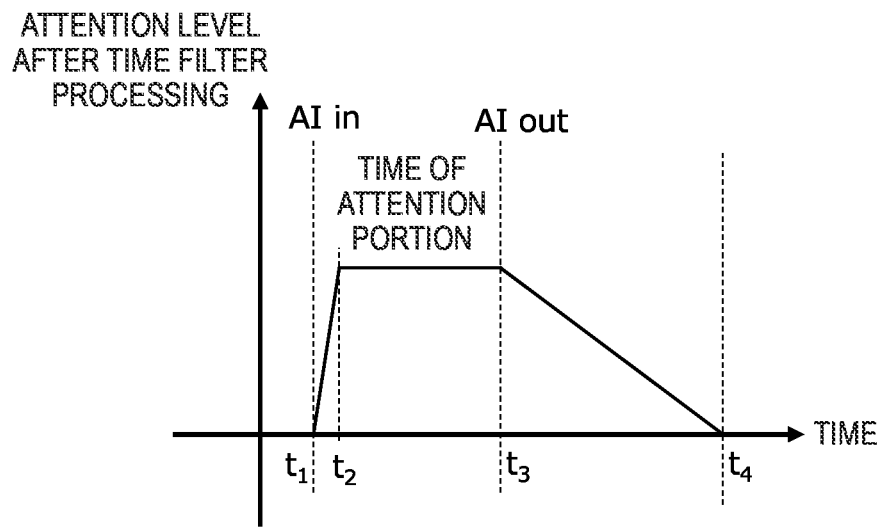
FIG. 6 is a graph showing an example of a relationship between time and an attention level after a time filter processing.

Here, the spatial filter processing will be described with reference to FIG. 5, and the time filter processing will be described with reference to FIG. 6. FIG. 5 is a graph showing an example of a relationship between an image space direction and an attention level after the spatial filter processing. FIG. 6 is a graph showing an example of a relationship between time and an attention level after the time filter processing. In FIG. 5, a horizontal axis represents the image space direction, and a vertical axis represents an attention level after the spatial filter processing. In FIG. 6, a horizontal axis represents time, and a vertical axis represents an attention level after the time filter processing.

An area ATT1 of a face of a person and the vicinity of the face of the person in the captured image data shown in FIG. 5 is, for example, an attention portion (that is, a portion from AI in to AI out) indicating an object (a moving body) detected by the AI detection unit 1611. The cyclic coefficient deriving unit 131 executes the spatial filter processing in the image space direction (that is, multiplies {(m−x)/m} of the expression G(t, x) described above). The spatial filter processing has a characteristic of gradually reducing (for example, linearly reducing) an attention level toward the periphery (for example, a peripheral area PER1) of the attention portion (in the area ATT1). In FIG. 5, x represents a distance from an attention portion detected by the AI detection unit 1611, and m represents a space effective range which is a predetermined fixed value (that is, a range indicating that a range from the attention portion to where is regarded as effective as the attention portion). Therefore, the cyclic coefficient deriving unit 131 can prevent the occurrence of a phenomenon in which an attention level is rapidly reduced at the moment when a portion becomes a non-attention portion in the image space direction by executing the spatial filter processing. Accordingly, the cyclic coefficient deriving unit 131 appropriately maintains the continuity between an attention portion and a peripheral area of the attention portion in the captured image data (for example, the fact that an afterimage is less likely to occur in the image space direction) when the noise reduction processing (blending processing) to be described later is executed.

In the horizontal axis shown in FIG. 6, a time point t1 indicates a time point at which an end portion (for example, a contour portion) of an attention portion starts to be detected by the AI detection unit 1611, a time point t2 indicates a time point at which a central portion of the attention portion starts to be detected by the AI detection unit 1611, a time point t3 indicates a time point at which the detection of the attention portion by the AI detection unit 1611 is completed, and a time point t4 indicates a time point at which the detection processing by the AI detection unit 1611 is completed. The cyclic coefficient deriving unit 131 uses the pixel unit attention level F(t) in the current frame and the pixel unit attention level G(t−1) after the spatial filter and the time filter are applied in the previous frame to execute the time filter processing having the characteristics shown in FIG. 6 in a time direction (that is, multiplies {γF(t)+(1−γ)G(t−1, x)} of the expression G(t, x) described above). Therefore, the cyclic coefficient deriving unit 131 can appropriately maintain the temporal continuity of the captured image data (for example, the fact that an afterimage is less likely to occur in the time direction) so as to prevent a rapid change of the attention portion in a temporal front-back direction.

Here, a relationship among the cyclic coefficient α, the intensity of the noise reduction processing executed by the blending processing unit 132, an SNR effect, and an afterimage prevention effect will be described with reference to FIG. 10. FIG. 10 is a diagram showing an example of a correspondence relationship among the noise reduction intensity, the SNR, and the afterimage prevention effect.

The cyclic coefficient α used in the noise reduction processing has a value of 0 to 1. When the cyclic coefficient α is small, the weight (influence) on the noise reduction processing by the previous frame is large, and the intensity of the noise reduction processing is high. In other words, a noise reduction effect in the current frame is enhanced due to the influence of the previous frame, thus the SNR is improved, and an afterimage prevention effect is reduced since it is likely to be influenced by the previous frame (see FIG. 10).

On the other hand, when the cyclic coefficient α is large, the weight (influence) on the noise reduction processing by the current frame is large, and the intensity of the noise reduction processing is low. That is, a noise reduction effect in the current frame is reduced due to the influence of the current frame, thus an SNR improvement effect is reduced, and an afterimage prevention effect is increased since it is less likely to be influenced by the previous frame (see FIG. 10).

The blending processing unit 132 executes a noise reduction processing on the current frame by using the derivation result of the cyclic coefficient α from the cyclic coefficient deriving unit 131, the previous frame, and the current frame. Specifically, the blending processing unit 132 executes an image processing (a noise reduction processing) of α×current frame (cur_frame)+(1−α)×previous frame (pre_frame) and outputs a result. In the first embodiment, the cyclic coefficient α is not a uniform (same) value over the entire (all) predetermined size of the current frame (captured image data), and the cyclic coefficient α is derived in a manner in which an attention portion has a high cyclic coefficient α (that is, the intensity of the noise reduction processing is low) and a non-attention portion has a low cyclic coefficient α (that is, the intensity of the noise reduction processing is high).

Therefore, the blending processing unit 132 can enhance the afterimage prevention effect by executing the noise reduction processing on the attention portion (for example, a moving body such as a face of a person) in the current frame (captured image data) at a lower intensity than an intensity (a reference intensity) at the time of a normal noise reduction processing. On the other hand, the blending processing unit 132 can enhance the SNR improvement effect by executing the noise reduction processing on the non-attention portion (for example, a background portion in which no moving body is present) in the current frame (captured image data) at a higher intensity than the intensity (the reference intensity) at the time of a normal noise reduction processing. The reference intensity is, for example, a median value (0.5) of the cyclic coefficient α, and is not limited to this value as long as the reference intensity is a value larger than "0" and less than "1" at which the effect of the noise reduction processing is obtained.

Figure 7:
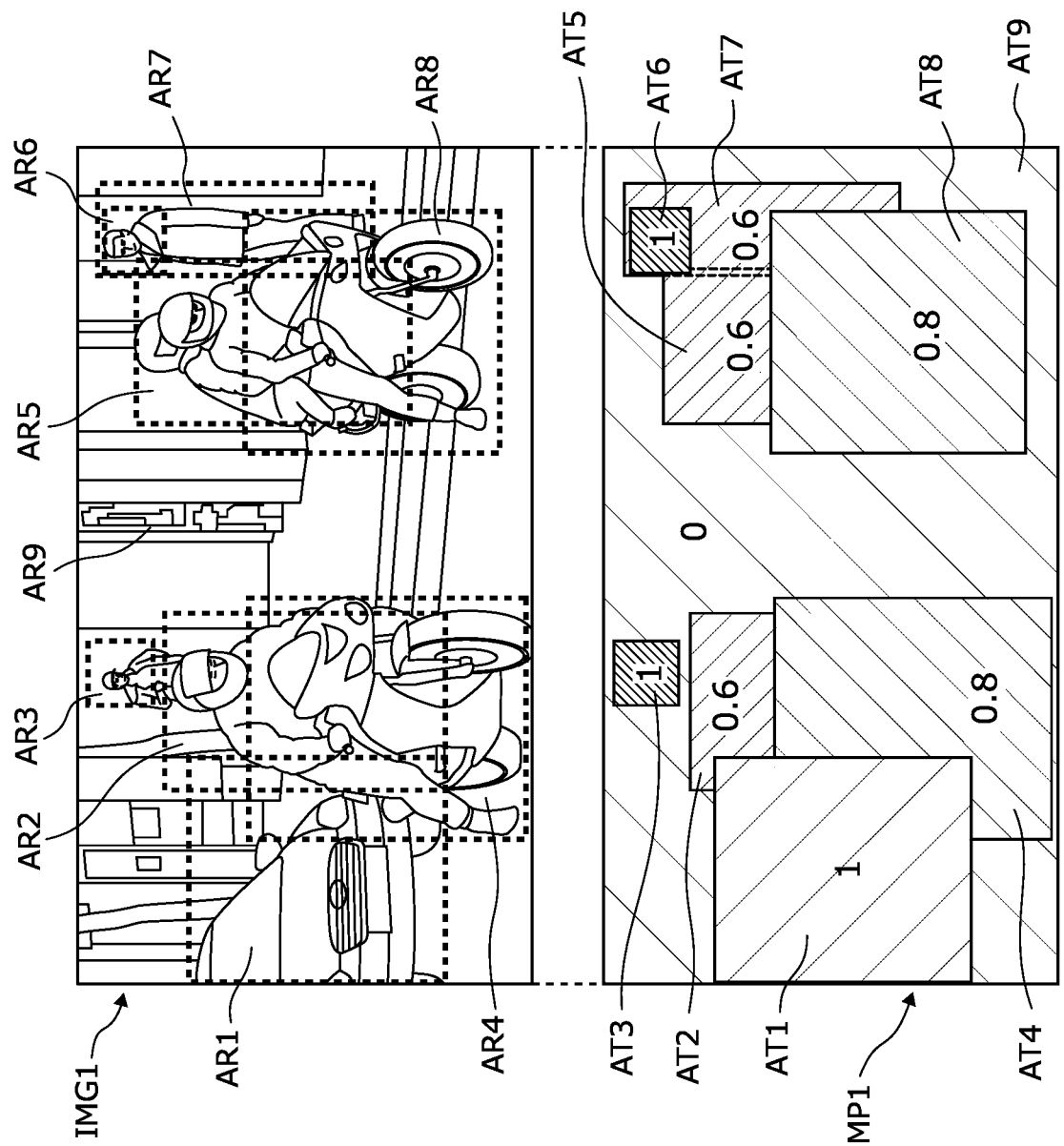
FIG. 7 is a diagram showing an example of a correspondence relationship between a detection area of an object on captured image data detected by an AI detection unit 1611 and an attention level (j) of the detection area.

FIG. 7 is a diagram showing an example of a correspondence relationship between detection areas AR1, AR2, AR3, AR4, AR5, AR6, AR7, and AR8 of objects in captured image data IMG1 detected by the AI detection unit 1611 and attention levels (j) of the detection areas AR1, AR2, AR3, AR4, AR5, AR6, AR7, and AR8.

The AI detection unit 1611 detects a vehicle traveling along the direction of the monitoring camera 10 in the detection area AR1, detects a driver of a two-wheel vehicle traveling along the direction of the monitoring camera 10 in the detection area AR2, detects a face of a pedestrian (person) walking along the direction of the monitoring camera 10 in the detection area AR3, and detects a two-wheel vehicle traveling along the direction of the monitoring camera 10 in the detection area AR4. In addition, the AI detection unit 1611 detects two persons riding on a two-wheel vehicle traveling along the direction of the monitoring camera 10 in the detection area AR5, detects a face of a pedestrian (person) who stands still while facing the monitoring camera 10 in the detection area AR6, detects the whole body of the pedestrian (person) who stands still while facing the monitoring camera 10 in the detection area AR7, and detects a two-wheel vehicle traveling along the direction of the monitoring camera 10 in the detection area AR8. A non-detection area AR9 is an area in which no object (moving body) to be focused is detected by the AI detection unit 1611.

The pixel unit attention level deriving unit 1612 refers to the attention level table in FIG. 4 and derives attention levels (j) of pixels corresponding to portions AT1, AT2, AT3, AT4, AT5, AT6, AT7, and AT8 of the objects (moving bodies) detected in the detection areas AR1, AR2, AR3, AR4, AR5, AR6, AR6, AR7, and AR8 as "1", "0.6", "1", "0.8", "0.6", "1", "0.6", and "0.8". The pixel unit attention level deriving unit 1612 derives an attention level (j) of a pixel corresponding to the non-detection area AR9 as "0". In this manner, the pixel unit attention level deriving unit 1612 generates an attention level map MP1 in which an attention level (j) for each pixel corresponding to the captured image data IMG1 shown in FIG. 7 is expanded, and stores the attention level map MP1 in the memory 14. The pixel unit attention level deriving unit 1612 derives the pixel unit attention level F(k, s, a, j) or the pixel unit attention level F(k, s, a, j, v) with reference to the attention level map MP1 described above.

The pixel unit attention level deriving unit 1612 may select a high attention level (j) when deriving an attention level (j) of a pixel in a portion where two or more detection areas overlap with each other. For example, the detection areas AR2 and AR4 overlap with each other in partial areas, as shown in FIG. 7, the pixel unit attention level deriving unit 1612 selects the attention level (j)="0.8" of the detection area AR4 that is higher than the attention level (j)="0.6" of the detection area AR2 as an attention level (j) in the overlapped partial areas. Similarly, a higher attention level (j) may be selected in other overlapped areas (for example, an area in which the detection areas AR1 and AR4 overlap with each other).

Figure 8:
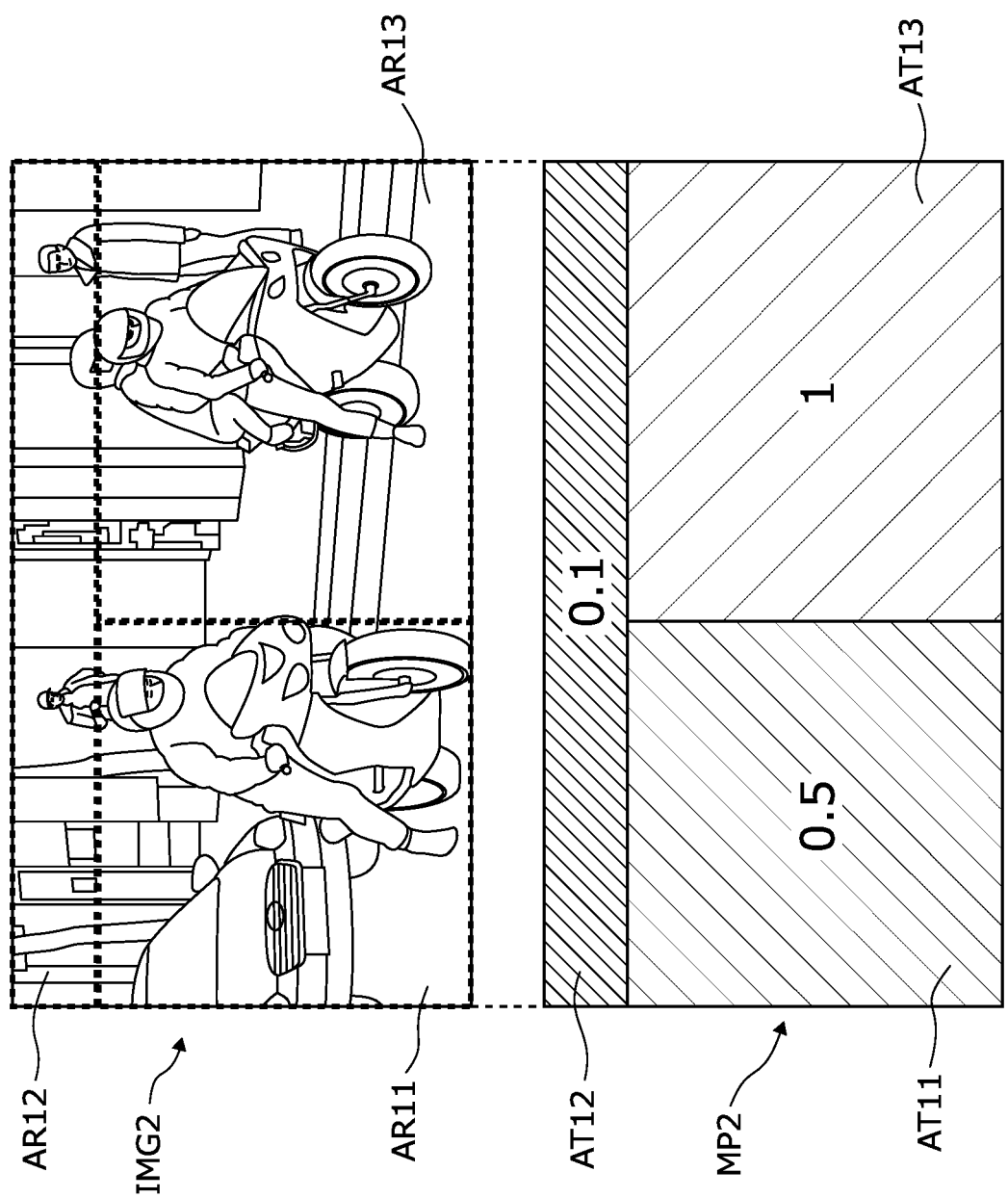
FIG. 8 is a diagram showing an example of a correspondence relationship between a detection assumption area of captured image data and an attention level of the detection assumption area.

FIG. 8 is a diagram showing an example of a correspondence relationship between detection assumption areas AR11, AR12, and AR13 of captured image data IMG2 and attention levels of the detection assumption areas AR11, AR12, and AR13. FIG. 9 is a diagram showing an example of an attention level table indicating an attention level (j) for each detection assumption area of the captured image data in FIG. 8.

In the first embodiment, the pixel unit attention level deriving unit 1612 may use the attention level table (see FIG. 9) provided in advance for each position (coordinate) in the captured image data IMG2, instead of the "attention level (j) for each type of a detected object" included in a detection result from the AI detection unit 1611.

In the attention level table in FIG. 9, a detection assumption area in which it is assumed that an object (moving body) is detected in view of a mounting position of the monitoring camera 10 is associated with a value of an attention level (j) predetermined for each detection assumption area. For example, in the captured image data IMG2 in FIG. 8, an attention level (j) is set to a low value of "0.1" in view of the fact that the probability of detecting an object (a moving body) in a portion "other than a road" is low. Similarly, an attention level (j) is set to "0.5" (median value) in view of the fact that an object (a moving body) is detected on a road provided at a position far from the monitoring camera 10 in a portion "road (far)". An attention level (j) is set to "1" (maximum value) in view of the fact that an object (a moving body) is likely to be detected on a road provided at a position close to the monitoring camera 10 in a portion "road (near)".

Therefore, the pixel unit attention level deriving unit 1612 refers to the attention level table in FIG. 9, and fixedly derives attention levels (j) of pixels corresponding to contour portions AT11, AT12, and AT13 of the detection assumption areas AR11, AR12, and AR13 as "0.5", "0.1", and "1". In this manner, the pixel unit attention level deriving unit 1612 generates an attention level map MP2 in which an attention level (j) for each detection assumption area corresponding to the captured image data IMG2 shown in FIG. 8 is expanded, and stores the attention level map MP2 in the memory 14. The pixel unit attention level deriving unit 1612 derives the pixel unit attention level F(k, s, a, j) or the pixel unit attention level F(k, s, a, j, v) with reference to the attention level map MP2 described above.

Figure 11:
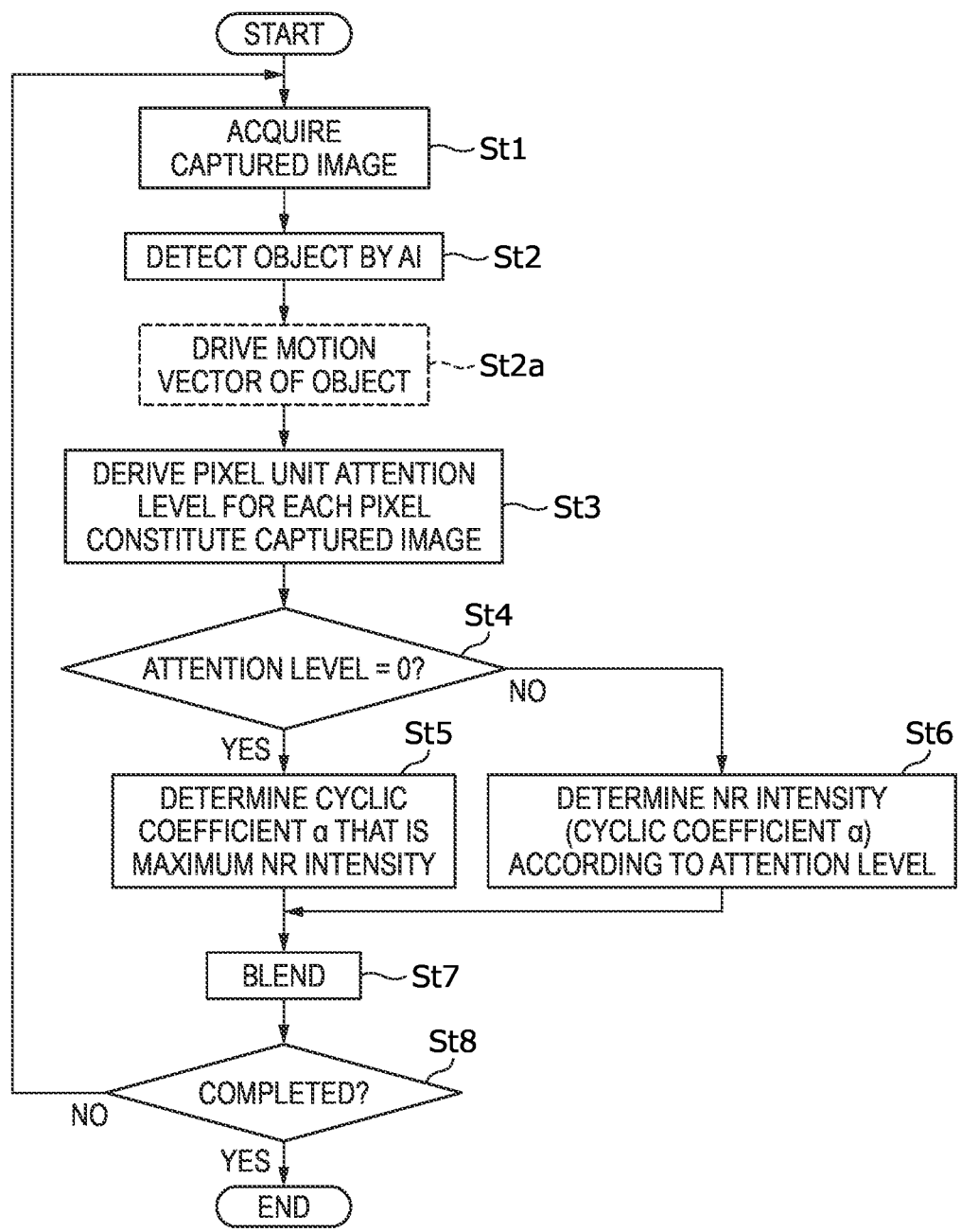
FIG. 11 is a flowchart showing an example of an operation procedure of the monitoring camera according to the first embodiment.

Next, an operation procedure of the monitoring camera 10 according to the first embodiment will be described with reference to FIG. 11. FIG. 11 is a flowchart showing an example of an operation procedure of the monitoring camera 10 according to the first embodiment. Each operation (step) shown in FIG. 11 is mainly executed by the processor 13 or the AI processing unit 16 of the monitoring camera 10.

In FIG. 11, the processor 13 acquires captured image data (that is, a current frame) generated by the image sensor 12 or the processor 13, and stores the captured image data in the memory 14 (St1). The AI processing unit 16 (for example, the AI detection unit 1611) detects an object of an attention portion (for example, a moving body such as a face of a person) from the captured image data acquired in step St1, based on an AI learning model read from the learning model memory 162 (St2). The AI processing unit 16 (for example, the motion vector deriving unit 1613) may derive a motion vector indicating a moving direction and a moving amount of the moving body (for example, a person) in the captured image data based on the detection result in step St2 (for example, a detection position in a current frame and a detection position in a previous frame of the moving body in the captured image data within the same angle of view) (St2*a*).

The AI processing unit 16 (for example, the pixel unit attention level deriving unit 1612) derives an attention level for each pixel (that is, a pixel unit attention level) of the captured image data (the current frame) to be processed in step St2 or steps St2 and St2*a* by using the processing result in step St2 or steps St2 and St2*a* (St3).

When the processor 13 (for example, the cyclic coefficient deriving unit 131) determines that the derivation result in step St3 (that is, the pixel unit attention level F(k, s, a, j) or F(k, s, a, j, v)) is 0 (St4, YES), the processor 13 determines an intensity of the noise reduction processing (that is, the cyclic coefficient α) to be a predetermined maximum value because the pixel is not an attention portion (St5).

On the other hand, when the processor 13 (for example, the cyclic coefficient deriving unit 131) determines that the derivation result in step St3 (that is, the pixel unit attention level F(k, s, a, j) or F(k, s, a, j, v)) is not 0 (St4, NO), the processor 13 determines an intensity of the noise reduction processing (that is, the cyclic coefficient α) according to a pixel unit attention level so that the intensity of the noise reduction processing is less than a maximum value because the pixel is an attention portion (St6).

The processor 13 (for example, the blending processing unit 132) executes a noise reduction processing on the current frame using the derivation result of the cyclic coefficient α derived in step St5 or step St6, the previous frame, and the current frame (St7). When the operation of the monitoring camera 10 is completed after step St7 (St8, YES), the operation of the monitoring camera 10 is ended.

On the other hand, when the operation of the monitoring camera 10 is not completed after step St7 (St8, NO), the processing of the monitoring camera 10 is returned to step St1. That is, the monitoring camera 10 repeatedly executes the processings in steps St1 to St8 until the operation of the monitoring camera 10 is completed.

Figure 12:
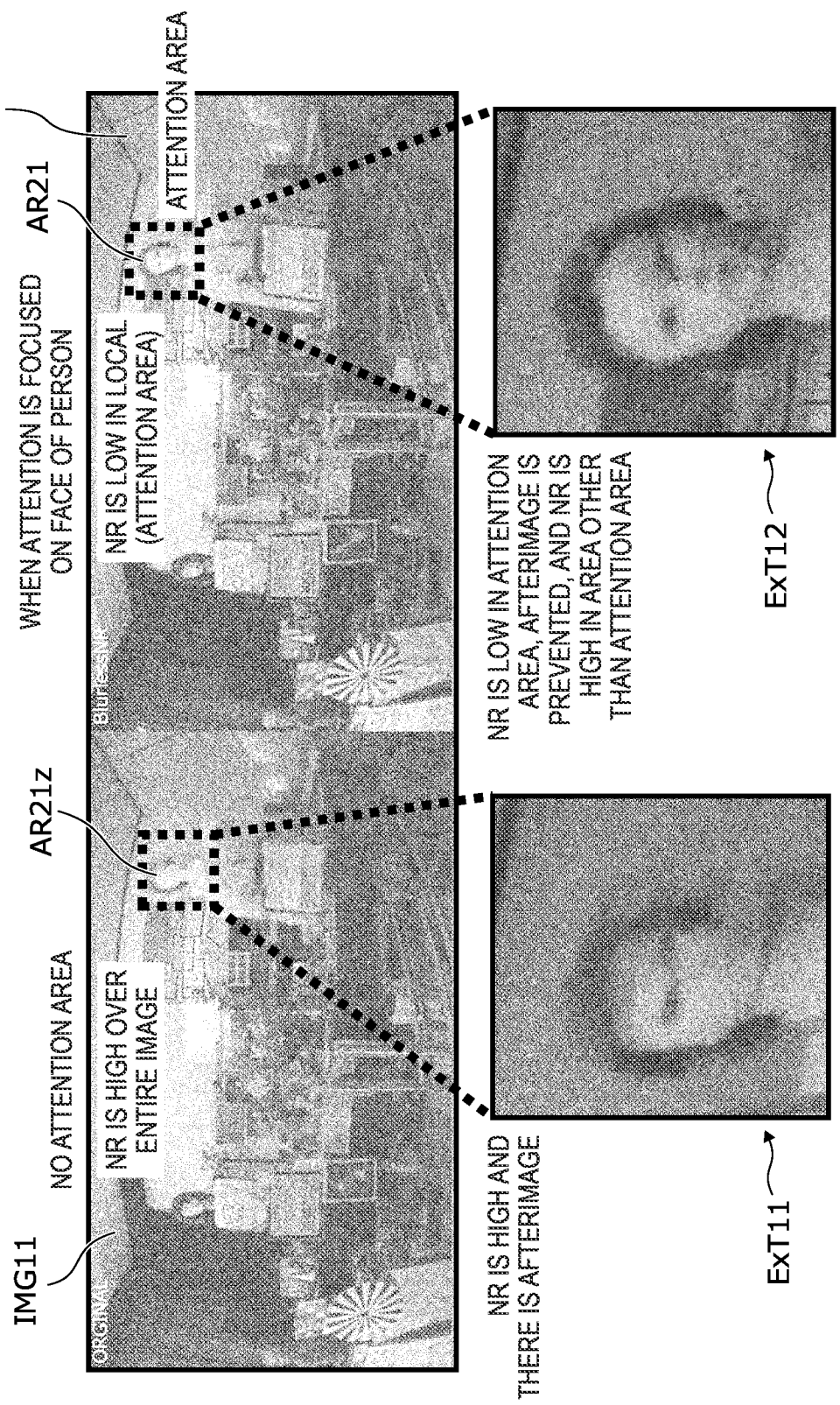
FIG. 12 is a diagram showing an example of a comparison result between a captured image after an NR processing in a case where there is no attention area and a captured image after an NR processing in a case where attention is focused on a face of a person.
Figure 13:
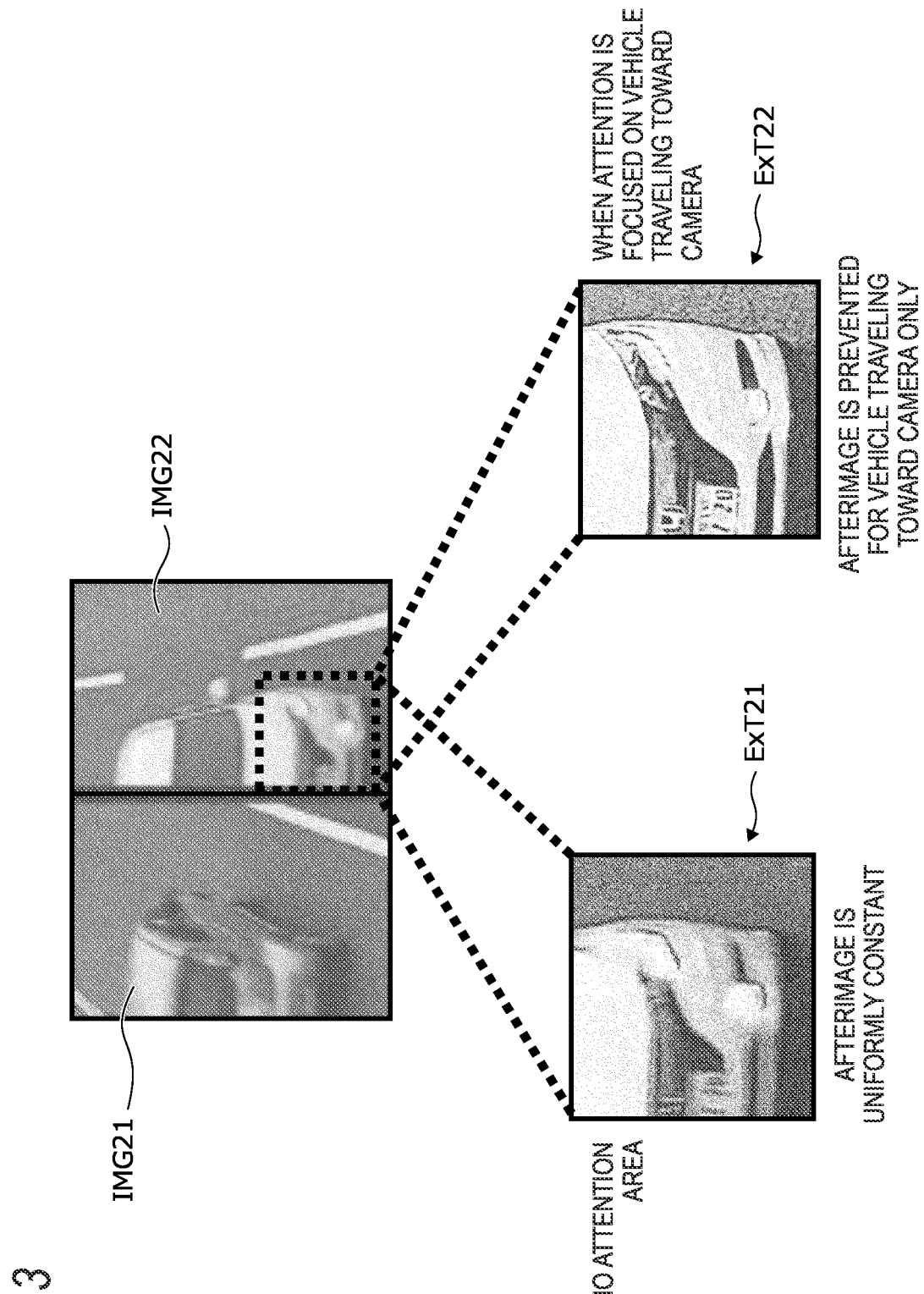
FIG. 13 is a diagram showing an example of a comparison result between a captured image after an NR processing in a case where there is no attention area and a captured image after an NR processing in a case where attention is focused on a vehicle traveling in a monitoring camera direction.

Next, an image comparison when the noise reduction processing is executed on captured image data in a comparative example and the first embodiment will be described with reference to FIGS. 12 and 13. FIG. 12 is a diagram showing an example of a comparison result between a captured image after an NR processing in a case where there is no attention area and a captured image after an NR processing in a case where attention is focused on a face of a person. FIG. 13 is a diagram showing an example of a comparison result between a captured image after an NR processing in a case where there is no attention area and a captured image after an NR processing in a case where attention is focused on a vehicle traveling in a monitoring camera direction. In both captured image data IMG21 and IMG22 shown in FIG. 13, a part of a vehicle is partially extracted.

In FIG. 12, it is assumed that a face of a person is detected in a room (indoors) in both captured image data IMG11 and IMG12. Different from the first embodiment, the noise reduction processing is uniformly executed on both a moving body portion AR21*z* (for example, a face of a person) and a portion other than the moving body portion AR21*z* in the captured image data IMG11 in the comparative example. Therefore, as shown in an enlarged view ExT11 of the moving body portion AR21*z*, an intensity of the noise reduction processing is higher than the reference intensity, and thus an afterimage remains, and the image quality of the captured image data IMG11 deteriorates. Therefore, the recognition accuracy of the moving body portion (for example, a face of a person) in the captured image data after the noise reduction processing is reduced.

On the other hand, the intensity of the noise reduction processing on an attention portion AR21 that is a moving body portion in the captured image data IMG12 and the intensity of the noise reduction processing on a portion other than the attention portion AR21 (that is, a non-detection area) are different from each other in the first embodiment. Accordingly, since the monitoring camera 10 according to the first embodiment executes the noise reduction processing on the attention portion AR21 at a lower intensity than the reference intensity, the afterimage prevention effect on the attention portion AR21 that is a moving body portion is improved. Therefore, as shown in an enlarged view ExT12 of the attention portion AR21 that is a moving body portion, since the intensity of the noise reduction processing is lower than the reference intensity, the afterimage prevention effect is improved, blurs of the moving body portion is reduced, and the image quality is improved. Since the monitoring camera 10 executes the noise reduction processing on the portion other than the attention portion AR21 (that is, the non-detection area) at a higher intensity than the reference intensity, the SNR improvement effect is improved. Accordingly, the recognition accuracy of the attention portion AR21 (for example, a face of a person) in the captured image data after the noise reduction processing is improved.

In FIG. 13, it is assumed that a vehicle is detected in both of the captured image data IMG21 and IMG22. Different from the first embodiment, the noise reduction processing is uniformly executed on both an attention portion (for example, a vehicle traveling toward the monitoring camera) and a portion other than the attention portion in the captured image data IMG21 and IMG22 in the comparative example. Therefore, as shown in an enlarged view ExT21 of the captured image data IMG22, an intensity of the noise reduction processing is higher than the reference intensity, and thus an afterimage remains over the entire captured image data IMG22, and the image quality of the captured image data IMG22 deteriorates. Although the captured image data IMG21 is not shown in the enlarged view ExT21, the image quality of the captured image data IMG21 deteriorates because the noise reduction processing is executed at a uniform intensity over the entire captured image data IMG21 in a similar manner. Therefore, the recognition accuracy of a license plate in the captured image data IMG21 and IMG22 after the noise reduction processing is reduced.

On the other hand, the intensity of the noise reduction processing on an attention portion in the captured image data IMG22 (for example, a vehicle traveling toward the monitoring camera 10) and the intensity of the noise reduction processing on a portion (for example, a portion other than the vehicle) other than the attention portion are different from each other in the first embodiment. Accordingly, the monitoring camera 10 according to the first embodiment executes the noise reduction processing on the attention portion at a lower intensity than the reference intensity, and thus the afterimage prevention effect of the vehicle traveling toward monitoring camera 10 is improved. Therefore, as shown in an enlarged view ExT22 of the captured image data IMG22, since the intensity of the noise reduction processing is lower than the reference intensity, the afterimage prevention effect of the vehicle portion is improved, blurs of the vehicle that is a moving body portion is reduced, and the image quality is improved. Since the monitoring camera 10 executes the noise reduction processing on a portion other than the attention portion (that is, a portion other than the vehicle) at a higher intensity than the reference intensity, the SNR improvement effect is improved.

As described above, the monitoring camera 10 according to the first embodiment includes the imaging unit CAP1 that captures an image of an imaging area, and the processor 13 that determines a first intensity indicating an intensity of the noise reduction processing executed on an attention portion (for example, the detection area AR1) in the captured image of the imaging area and a second intensity indicating an intensity of the noise reduction processing executed on a non-attention portion (for example, the non-detection area AR9) in the captured image to be different from each other. The first intensity is lower than the second intensity. The processor 13 executes the noise reduction processing on the attention portion based on the determined first intensity, executes the noise reduction processing on the non-attention portion based on the determined second intensity, and outputs an image after the noise reduction processing.

Accordingly, the monitoring camera 10 can prevent an afterimage of a subject to be focused in the captured image data regardless of the brightness and darkness of an environment around an installation location of the monitoring camera 10, and can reduce noises in the entire image (that is, the entire size of the captured image data). Therefore, the monitoring camera 10 can improve the recognition accuracy of a subject in the captured image data after the noise reduction processing by executing the noise reduction processing on the attention portion and the non-attention portion at different intensities.

The monitoring camera 10 further includes the AI detection unit 1611 that detects an attention portion in the captured image of the imaging area by using an artificial intelligence (AI) learning model. Accordingly, the monitoring camera 10 can detect an attention portion (for example, a moving body such as a face of a person) in the captured image data with high accuracy.

The processor 13 determines at least one of the first intensity and the second intensity based on an attention level for each type of a subject indicated by an attention portion of the captured image data. Accordingly, the monitoring camera 10 can execute highly accurate image editing such that an afterimage is not noticeable even when the noise reduction processing is executed on an object (a moving body) having a high ratio (tendency) to be focused in a recognition processing of the captured image data.

The processor 13 determines at least one of the first intensity and the second intensity based on the presence or absence of an attention portion (for example, the detection area (k)), an attention coefficient for each type of a subject indicated by an attention portion (for example, the attention level (j) for each type of a detected object), a weight coefficient (for example, the weight coefficient (s)) based on a size of an attention portion, and the certainty (for example, the AI score (a)) of a subject detected by the AI learning model. Accordingly, the monitoring camera 10 can adaptively determine the intensity of the noise reduction processing to be executed on an attention portion (for example, a moving body such as a face of a person) in accordance with various pieces of attribute information of the attention portion reflected in the captured image data.

The processor 13 determines the second intensity to be a maximum value. As a result, the monitoring camera 10 can reduce a noise component of a non-attention portion in the captured image data or a portion of the captured image data that is less likely to be focused by the noise reduction processing, and thus can improve the SNR of the entire captured image data.

The processor 13 drives an attention level of a current frame based on the presence or absence of an attention portion (for example, the detection area (k)), an attention coefficient for each type of a subject indicated by an attention portion (for example, the attention level (j) for each type of a detected object), a weight coefficient (for example, the weight coefficient (s)) based on a size of an attention portion, and the certainty (for example, the AI score (a)) of a subject detected by the AI learning model, and determines the first intensity by executing a spatial filter processing and a time filter processing using the derived attention level of a current frame and an attention level of a previous frame immediately before the current frame. As a result, the monitoring camera 10 can prevent the occurrence of a phenomenon in which an attention level is rapidly reduced at the moment when a portion becomes a non-attention portion in the image space direction, and can appropriately maintain the continuity between an attention portion and a peripheral area of the attention portion in the captured image data (for example, the fact that an afterimage is less likely to occur in the image space direction) when the noise reduction processing (the blending processing) is executed. The monitoring camera 10 can appropriately maintain the temporal continuity of the captured image data (for example, the fact that an afterimage is less likely to occur in the time direction) so as to prevent a rapid change of the attention portion in a temporal front-back direction.

The processor 13 determines the first intensity based on an attention level determined for each coordinate in the captured image of the imaging area. Accordingly, the monitoring camera 10 can easily select an attention level for each pixel according to a position (coordinates) of the captured image data of the imaging area, and thus can easily determine the first intensity.

The processor 13 further determines the first intensity based on the motion vector (v) of a subject. Accordingly, for example, even when an attention portion (for example, a face of a person) is detected by the AI detection unit 1611, in a case where no motion occurs based on a value of the motion vector, image quality is less likely to deteriorate even when the monitoring camera 10 executes the noise reduction processing at an intensity the same as a still portion.

The attention portion is a moving body moving in the imaging area. Accordingly, the monitoring camera 10 can improve the afterimage prevention effect by executing the noise reduction processing at a low intensity on a focused moving body moving in the imaging area, and can improve the SNR by executing the noise reduction processing at a high intensity on a portion that does not move in the imaging area.

Although various embodiments have been described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in various embodiments described above may be combined freely within a range not deviating from the spirit of the invention.

INDUSTRIAL APPLICABILITY

The present disclosure is useful as a monitoring camera, an image quality improving method, and a program for preventing an afterimage of a subject to be focused in a captured image, reducing noises, and improving recognition accuracy of the subject, regardless of a surrounding environment.

What is claimed is:

1. A monitoring camera, comprising:
a camera configured to capture a first image of an imaging area; and
a processor configured to detect a moving body portion and a still portion of the first image, the moving body portion including a moving body and being an attention portion in the first image of the imaging area, the still portion being a non-attention portion in the first image of the imaging area;
the processor further configured to determine a first intensity and a second intensity, the first intensity being different from the second intensity, the first intensity being of a first noise reduction processing executed on the attention portion in the first image of the imaging area, the second intensity being of a second noise reduction processing executed on the non-attention portion in the first image,
wherein the first intensity is lower than the second intensity, and
wherein the processor is configured
to execute the first noise reduction processing on the attention portion based on the first intensity,
to execute the second noise reduction processing on the non-attention portion based on the second intensity, and
to output a second image after the first noise reduction processing and the second noise reduction processing are executed, whereby the second image includes plural areas with different intensities of noise reduction processing,
wherein the processor is configured to determine at least one of the first intensity and the second intensity based on an attention level for each type of a subject indicated by the attention portion.

2. The monitoring camera according to claim 1, further comprising:
an AI calculation processor configured to detect the attention portion on an image of the imaging area using an artificial intelligence (AI) learning model.

3. The monitoring camera according to claim 2,
wherein the processor is configured to determine at least one of the first intensity and the second intensity based on a presence or an absence of the attention portion, an attention coefficient for each type of a subject indicated by the attention portion, a weight coefficient based on a size of the attention portion, and a certainty of the subject detected by the AI learning model.

4. The monitoring camera according to claim 1,
wherein the processor is configured to determine the second intensity to be a maximum value of noise reduction processing.

5. The monitoring camera according to claim 3,
wherein the processor is configured
to derive a first attention level of a current frame based on the presence or the absence of the attention portion, the attention coefficient for each type of the subject indicated by the attention portion, the weight coefficient based on the size of the attention portion, and the certainty of the subject detected by the AI learning model, and
to determine the first intensity by executing a spatial filter processing and a time filter processing using the first attention level of the current frame and a second attention level of a previous frame immediately before the current frame.

6. The monitoring camera according to claim 1,
wherein the processor is configured to determine the first intensity based on an attention level determined for each coordinate in the first image of the imaging area.

7. The monitoring camera according to claim 3,
wherein the processor is configured to further determine the first intensity based on a motion vector of the subject.

8. The monitoring camera according to claim 1,
wherein the moving body includes a person or a vehicle moving in the imaging area.

9. The monitoring camera according to claim 1, wherein when the processor detects the moving body portion and the still portion of the first image, a first value is assigned to each pixel of the first image in which an object is detected as a detection area value, and a second value is assigned to each pixel of the first image in which no object is detected as the detection area value, and
the first value is different than the second value.

10. The monitoring camera according to claim 9, wherein when the processor detects the moving body portion and the still portion of the first image, one of plural values is further assigned to each pixel of the first image for which the first value is assigned, based on a type of the object detected in the pixel, as an attention level value.

11. The monitoring camera according to claim 10, wherein when the processor detects the moving body portion and the still portion of the first image, a third value is further assigned to each pixel of the first image for which the first value is assigned, as a weight coefficient value, in response to a ratio of a first size of the object to a second size of the first image being less than a lower limit value, and a fourth value is further assigned to each pixel of the first image for which the first value is assigned, as the weight coefficient value, in response to the ratio of the first size of the object to the second size of the first image being larger than an upper limit value, and the third value is different than the fourth value.

12. The monitoring camera according to claim 11, wherein the first value is same as the fourth value.

13. The monitoring camera according to claim 11, wherein the processor determines at least one of the first intensity or the second intensity at based on at least the detection area value, the attention level value, and the weight coefficient value of each pixel.

14. An image quality improving method to be executed by a monitoring camera, the image quality improving method comprising:

capturing a first image of an imaging area;

detecting, by a processor, a moving body portion and a still portion of the first image, the moving body portion including a moving body and being an attention portion in the first image of the imaging area, the still portion being a non-attention portion in the first image of the imaging area;

determining, by the processor, a first intensity and a second intensity, the first intensity being different from the second intensity, the first intensity being of a first noise reduction processing executed on the attention portion in the first image of the imaging area, the second intensity being of a second noise reduction processing executed on the non-attention portion in the first image;

executing the first noise reduction processing on the attention portion based on the first intensity, and executing the second noise reduction processing on the non-attention portion based on the second intensity; and outputting a second image after the first noise reduction processing and the second noise reduction processing are executed, whereby the second image includes plural areas with different intensities of noise reduction processing, wherein the first intensity is lower than the second intensity, and wherein the processor is configured to determine at least one of the first intensity and the second intensity based on an attention level for each type of a subject indicated by the attention portion.

15. A non-transitory computer readable storage medium including an image quality improvement program, the image quality improvement program, when executed by a computer, causing the computer to perform an image quality improving method, the image quality improving method comprising:

capturing a first image of an imaging area;

detecting a moving body portion and a still portion of the first image, the moving body portion including a moving body and being an attention portion in the first image of the imaging area, the still portion being a non-attention portion in the first image of the imaging area;

determining a first intensity and a second intensity, the first intensity being different from the second intensity, the first intensity being of a first noise reduction processing executed on the attention portion in the first image of the imaging area, the second intensity being of a second noise reduction processing executed on the non-attention portion in the first image;

executing the first noise reduction processing on the attention portion based on the first intensity, and executing the second noise reduction processing on the non-attention portion based on the second intensity; and outputting a second image after the first noise reduction processing and the second noise reduction processing are executed, whereby the second image includes plural areas with different intensities of noise reduction processing, wherein the first intensity is lower than the second intensity, and wherein the processor is configured to determine at least one of the first intensity and the second intensity based on an attention level for each type of a subject indicated by the attention portion.

* * * * *